(12) United States Patent
Subramanian

(10) Patent No.: US 12,200,151 B2
(45) Date of Patent: Jan. 14, 2025

(54) SYSTEMS AND METHODS FOR PROVIDING SECURITY FOR QR CODES

(71) Applicant: Hemang Subramanian, Miami, FL (US)

(72) Inventor: Hemang Subramanian, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/048,599

(22) Filed: Oct. 21, 2022

(65) Prior Publication Data

US 2023/0163981 A1    May 25, 2023

Related U.S. Application Data

(60) Provisional application No. 63/264,353, filed on Nov. 19, 2021.

(51) Int. Cl.
| | |
|---|---|
| *H04L 29/06* | (2006.01) |
| *G06K 7/14* | (2006.01) |
| *H04L 9/00* | (2022.01) |
| *H04L 9/30* | (2006.01) |

(52) U.S. Cl.
CPC .............. *H04L 9/50* (2022.05); *G06K 7/1417* (2013.01); *H04L 9/30* (2013.01)

(58) Field of Classification Search
CPC ......... H04L 9/50; H04L 9/30; H04L 63/0236; H04L 9/0625; G06K 7/1417; G09C 5/00; G05D 1/2446; G06Q 20/3274; G06Q 20/3276; G06F 16/748; G06F 16/9566; G06V 30/1452; H04H 20/93; H04N 21/236; H04N 21/858; H04N 21/8586; G05B 23/024; G05B 23/0254; G05B 23/0281
See application file for complete search history.

(56) References Cited

U.S. PATENT DOCUMENTS

| | | | |
|---|---|---|---|
| 11,048,768 B1 * | 6/2021 | Kolbert | ................... H04L 51/52 |
| 2012/0316950 A1 | 12/2012 | Laporte et al. | |
| 2015/0089568 A1 * | 3/2015 | Sprague | .............. H04L 63/0853 726/1 |
| 2016/0034875 A1 | 2/2016 | Stevens et al. | |
| 2016/0098723 A1 * | 4/2016 | Feeney | ................ G06Q 20/065 705/75 |

(Continued)

FOREIGN PATENT DOCUMENTS

| | | |
|---|---|---|
| JP | 6031729 | 11/2016 |
| JP | 6145792 | 6/2017 |

OTHER PUBLICATIONS

Hemang Subramanian, Decentralized Blackchain-Based Electronic Marketplaces, Communications of the ACM, Jan. 2018, vol. 61, No. 1, pp. 78-84, 7 pages.

*Primary Examiner* — Joseph P Hirl
*Assistant Examiner* — Leynna Truvan
(74) *Attorney, Agent, or Firm* — SALIWANCHIK, LLOYD & EISENSCHENK

(57) ABSTRACT

Systems and methods for providing additional security for quick response (QR) codes are provided. An additional layer of security for QR codes, a mechanism to record the reputation of the payload in a QR code, and other functionality are provided. A combination of a public blockchain system, public key encryption, and a redirection mechanism can be used.

15 Claims, 5 Drawing Sheets

(56) References Cited

U.S. PATENT DOCUMENTS

| | | | | |
|---|---|---|---|---|
| 2016/0323107 A1* | 11/2016 | Bhogal | ............... | H04W 12/10 |
| 2017/0075877 A1* | 3/2017 | Lepeltier | ............... | G06F 40/117 |
| 2017/0324729 A1* | 11/2017 | Hon | ............... | H04L 63/083 |
| 2019/0303909 A1 | 10/2019 | De La Torre | | |
| 2019/0349346 A1* | 11/2019 | Curtis | ............... | H04W 12/084 |
| 2020/0320458 A1* | 10/2020 | Loreto | ............... | H04L 63/102 |
| 2021/0006592 A1* | 1/2021 | Heyman | ............... | H04L 63/1483 |
| 2021/0248338 A1* | 8/2021 | Spivack | ............... | G06K 7/10831 |

\* cited by examiner

FIG. 3

SYSTEMS AND METHODS FOR PROVIDING SECURITY FOR QR CODES

CROSS-REFERENCE TO RELATED APPLICATION

This application claims the benefit of U.S. Provisional Application Ser. No. 63/264,353, filed Nov. 19, 2021, the disclosure of which is hereby incorporated by reference in its entirely, including all figures, tables, and drawings.

BACKGROUND

Quick response (QR) codes are important security devices that connect the physical to the virtual. QR codes have become ubiquitous, globally, as touch-free ways of transmitting or conveying data or information. Particularly during times where precautionary measures have been taken due to COVID-19, QR codes have become extremely prevalent as a mode for doing business, for example at restaurants, cafes, schools, and many other businesses.

QR codes are subject to vulnerabilities that could potentially harm each individual scanning the QR code. An issue with QR codes is that they are universal, and people are typically trusting and/or naive with scanning of QR codes. Often, the first thing an individual does upon seeing a QR code is scan it (e.g., to be directed to the associated uniform resource locator (URL)) without giving it a second thought. Each QR code has something known as the payload that is attached to the QR code.

While QR codes can often be trusted, they can also be replaced to hack into the reader's device, often to maliciously install unwanted software on devices, and/or to lead users to undesired websites, which may have been created specifically to lead such users there for malicious purposes. In addition, QR codes cannot really be erased or exterminated remotely. The data in the QR code essentially lives as long as the QR code exists.

BRIEF SUMMARY

Embodiments of the subject invention provide novel and advantageous systems and methods for providing additional security for quick response (QR) codes. The systems and methods provide an additional layer of security for QR codes, a mechanism to record the reputation of the payload in a QR code, and other functionality. A combination of a public blockchain system, public key encryption, and a redirection mechanism can be used to provide two-factor authentication and security for QR codes. Security devices and methods for QR codes can be adopted by businesses or other entities using QR codes to interface with customers to greatly reduce the risks of malicious misappropriation of data (e.g., data of the customers and/or businesses or other entities offering the QR code(s)).

In an embodiment, a system for providing security for QR codes can comprise: a processor; and a machine-readable medium in operable communication with the processor, the one machine-readable medium having instructions stored thereon that, when executed by the processor, perform the following steps: receiving data of a QR code scanned by a device of a user of the system, the data comprising a uniform resource locator (URL) and a key; providing a prompt to the device of the user requesting the user to input whether the user trusts the URL of the QR code; if the user inputs that the user does not trust the URL the QR code, denying the device access to the URL the QR code; if the user inputs that the user trusts the URL the QR code, checking the key of the QR code against verification data of a blockchain; if the key of the QR code does not match the verification data of the blockchain, denying the device access to the URL the QR code; and if the key of the QR code matches the verification data of the blockchain, allowing the device access to the URL of the QR code. The key of the QR code can be a public key. The blockchain can be, for example, the Bitcoin Blockchain, the Ethereum Blockchain, or the Algorand Blockchain, though embodiments are not limited thereto. The device of the user can be a mobile and/or smart device, and the device can comprise a display to which the prompt requesting the user to input whether the user trusts the URL of the QR code is provided (e.g., by the processor). The verification data of the blockchain can be a smart contract, and the smart contract can be generated by an owner of the URL of the QR code (e.g., the company or organization having the web site to which the URL directs). The instructions when executed can further perform the following step(s): if the user inputs that the user does not trust the URL the QR code, decreasing a reputation value of the URL of the QR code; and/or if the user inputs that the user trusts the URL the QR code, increasing the reputation value of the URL of the QR code. The prompt provided to the device of the user (requesting the user to input whether the user trusts the URL of the QR code) can further comprise providing to the device of the user the reputation value of the URL of the QR code. The reputation value can be displayed on the display of the device along with the prompt requesting the user to input whether the user trusts the URL of the QR code. The reputation value can help the user decide whether to trust the URL if the user is uncertain.

In another embodiment, a method for providing security for QR codes can comprise: receiving (e.g., by a processor in operable communication with a device of a user) data of a QR code scanned by the device of the user, the data comprising a URL and a key; providing (e.g., by the processor) a prompt to the device of the user requesting the user to input whether the user trusts the URL of the QR code; if the user inputs that the user does not trust the URL the QR code, denying (e.g., by the processor) the device access to the URL the QR code; if the user inputs that the user trusts the URL the QR code, checking (e.g., by the processor) the key of the QR code against verification data of a blockchain; if the key of the QR code does not match the verification data of the blockchain, denying (e.g., by the processor) the device access to the URL the QR code; and if the key of the QR code matches the verification data of the blockchain, allowing (e.g., by the processor) the device access to the URL of the QR code. The key of the QR code can be a public key. The blockchain can be, for example, the Bitcoin Blockchain, the Ethereum Blockchain, or the Algorand Blockchain, though embodiments are not limited thereto. The device of the user can be a mobile and/or smart device, and the device can comprise a display to which the prompt requesting the user to input whether the user trusts the URL of the QR code is provided (e.g., by the processor). The verification data of the blockchain can be a smart contract, and the smart contract can be generated by an owner of the URL of the QR code (e.g., the company or organization having the web site to which the URL directs). The method can further comprise: if the user inputs that the user does not trust the URL the QR code, decreasing (e.g., by the processor) a reputation value of the URL of the QR code; and/or if the user inputs that the user trusts the URL the QR code, increasing (e.g., by the processor) the reputation value of the URL of the QR code. The prompt provided to the device of the user (requesting the user to input whether the user trusts the URL of the QR code) can further comprise providing (e.g., by the processor) to the device of the user the reputation value of the URL of the QR code. The reputation value can be displayed on the display of the device along with the prompt requesting the user to input whether the user trusts the URL of the QR code. The reputation value can help the user decide whether to trust the URL if the user is uncertain.

BRIEF DESCRIPTION OF DRAWINGS

FIG. 3 shows a printout of transaction details for checking a uniform resource locator (URL) of a payload of a QR code, according to an embodiment of the subject invention.

DETAILED DESCRIPTION

Figure 1:
FIG. 1 shows a quick response (QR) code.

Embodiments of the subject invention provide novel and advantageous systems and methods for providing additional security for quick response (QR) codes. The systems and methods provide an additional layer of security for QR codes, a mechanism to record the reputation of the payload in a QR code, and other functionality. A combination of a public blockchain system, public key encryption, and a redirection mechanism can be used to provide two-factor authentication and security for QR codes. Security devices and methods for QR codes can be adopted by businesses or other entities using QR codes to interface with customers to greatly reduce the risks of malicious misappropriation of data (e.g., data of the customers and/or businesses or other entities offering the QR code(s)).

Embodiments of the subject invention provide an easily usable mechanism to give an additional layer of security to QR codes. Along with the ubiquity of QR codes, the problem of malicious uses of QR codes has also become very common, where devices that read QR codes can be compromised in many ways. A combination of a public blockchain system, public key encryption, and redirection mechanism can be used in a security device for QR codes to greatly reduce the risks of malicious misappropriation of data.

The use of publicly available blockchain infrastructure can assist marketplace related businesses for reputation management, data-encoding service providers, and software as a service (SAAS) add-on businesses. No related art system or method uses publicly available blockchain technology for anything at all. Embodiments of the subject invention can help businesses and other entities (e.g., large businesses with well-known names) prevent or inhibit malicious overriding of QR codes provided for business or other useful purposes, and can protect both users and businesses (or other entities using or offering QR codes) from malicious use. The software used for redirection to and from the QR code can incrementally improve the reputation of the platform, as well as prevent or inhibit malicious use of the QR code. Many additional types of functionality can also be provided by systems and methods of embodiments of the subject invention, including expiration of the QR code, expiration of data, and/or timestamping.

When a QR code is scanned, it releases a payload into the scanning software on the browser (i.e., either a uniform resource locator (URL) or some other type of data for the reader to use). This payload is typically used to encode information such as price, details of a product, location of an event, etc. It is often used to redirect the user (i.e., person scanning the QR code) to a URL of the business or other entity providing the QR code (e.g., to be able to read the installation manual for furniture). While the redirection URL of a QR code cannot generally be hacked directly or changed by the creator of the QR code, individuals can: maliciously access (or hack software on) devices that read QR codes; utilize a tool (e.g., QRgen) to create malicious payloads for security vulnerabilities (e.g., for eight different types of security vulnerabilities); and/or utilize a tool to provide access to the device's file system to external programs (e.g., browser exploitation framework project (BEFP) has demonstrated a vulnerability wherein those who access the wrong URL will give such access to external programs, and this has been tested in Android® phones and devices).

If a user scans the wrong QR code, he or she can read a URL that can inject cross site scripting (CSS) Javascript that can cause the browser to do one or more of a whole set of malicious activities such as access one's bank account. A malicious scan can access a server database or the device address book (or other data on the device), and hackers can use perfectly safe-looking QR codes to read personal data from these devices.

Consider a ticket scanner or a phone scanner that reads data. It has been shown that it is easy to install applications on Android® phones by feigning installation of a critical update onto the phone by tricking the owner of the phone, using only a QR code injected with an incorrect URL. The malicious software package can be installed from the QR code URL onto the phone, thus making the phone vulnerable.

Embodiments of the subject invention can inject a URL check screen, where the user can chose to proceed to the actual content (payload) of the QR code. Embodiments can also provide a secure blockchain-centric mechanism to prevent or inhibit the vulnerabilities discussed herein, where only the secure agency responsible for creating the URL will be able to write it into the blockchain. Additionally, the URL once created and signed by the keys of the creator will continue to exist on the blockchain perennially and will never be altered as long as the blockchain exists (which is in perpetuity). Only the creator can sign with the keys, so when verification occurs (see discussion of second factor of authentication below), a matching key can serve as confirmation of the correct payload of a QR code.

Any blockchain can be used, for example, the Bitcoin Blockchain, the Ethereum Blockchain, or other blockchains such as Algorand that are publicly, globally deployed and accessible over networks.

Figure 2:
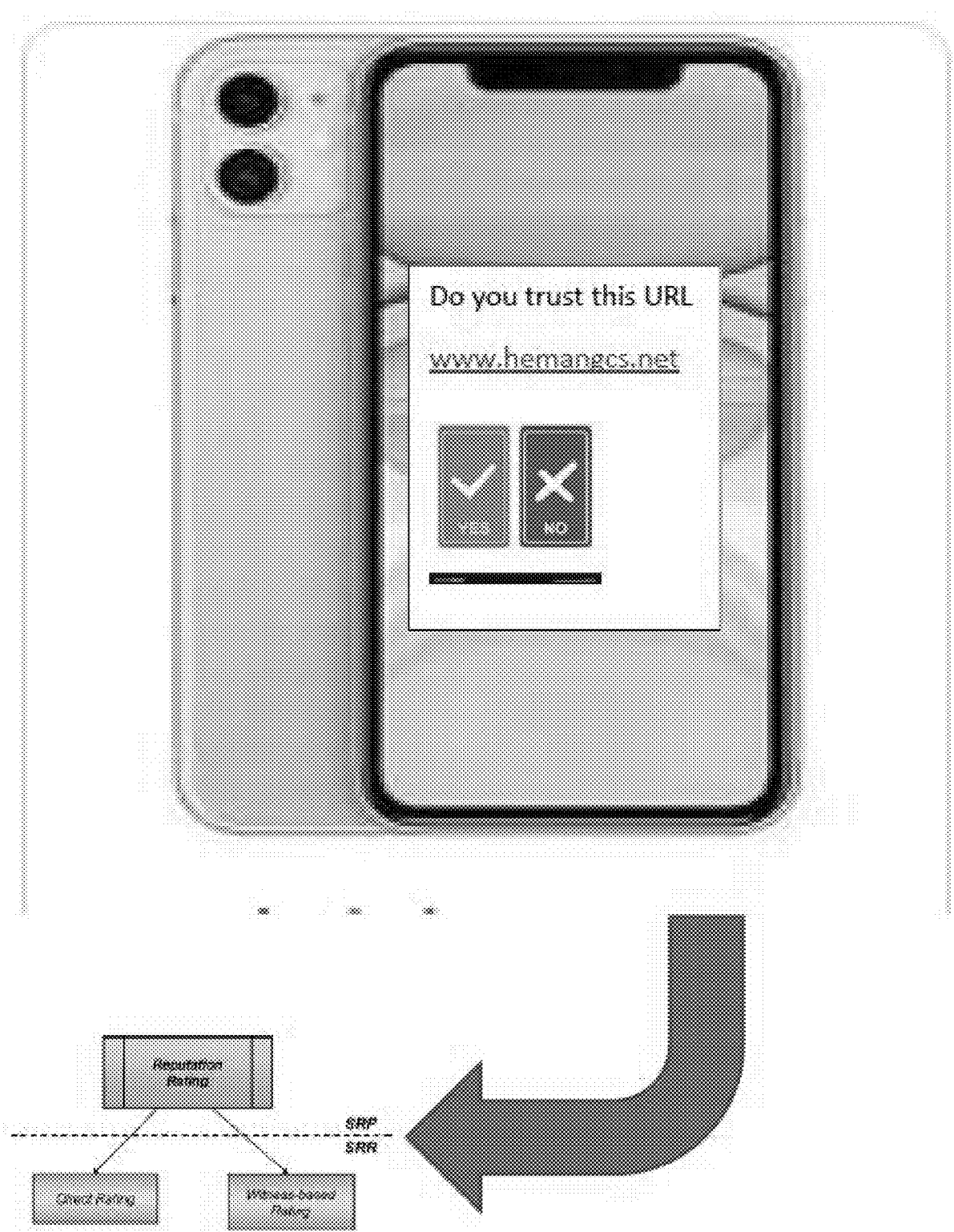
FIG. 2 shows an input screen for a user, according to an embodiment of the subject invention, allowing for selection to proceed to the next screen or not.

FIG. 1 shows a QR code; it contains a payload, which often comprises a URL or associated data in it. The QR code can redirect to a URL such as www.hemangcs.net, which can include a payload such as http://www.hemangcs.net * public key. When passed through a security device of an embodiment of the subject invention, this QR code would redirect to a URL of the following format: http://myCodechecker.com/&rdurl=http://www.hemangcs.net& public_key=8979712312123123AADDA ##. The device myCodechecker.com is a web service that will cause the reader's device to open this URL with two functionalities. The first functionality is that it can display to the user what other users have said about the URL (e.g., hemangcs.net). It can prompt the user to rate the reputation of this link, and if they think this link is genuine, they can proceed to the URL (or access the payload). The second functionality is that the rating mechanism can be expanded to create an entire reputation schema. An example illustration of the user interface is shown in FIG. 2. The link myCodehecker can use this mechanism to provide a symbolic verification and charge third parties a fee for enabling them to create secure QR codes. In exchange the myCodeChecker can also give users the ability to access user statistics about the number of visits to the website, the reputation of the sites they accessed, and other abilities, in addition to providing security. Upon clicking Yes in the user interface (see FIG. 2), the result is recorded onto a reputation mechanism and the URL is verified in the second stage.

Figure 3:
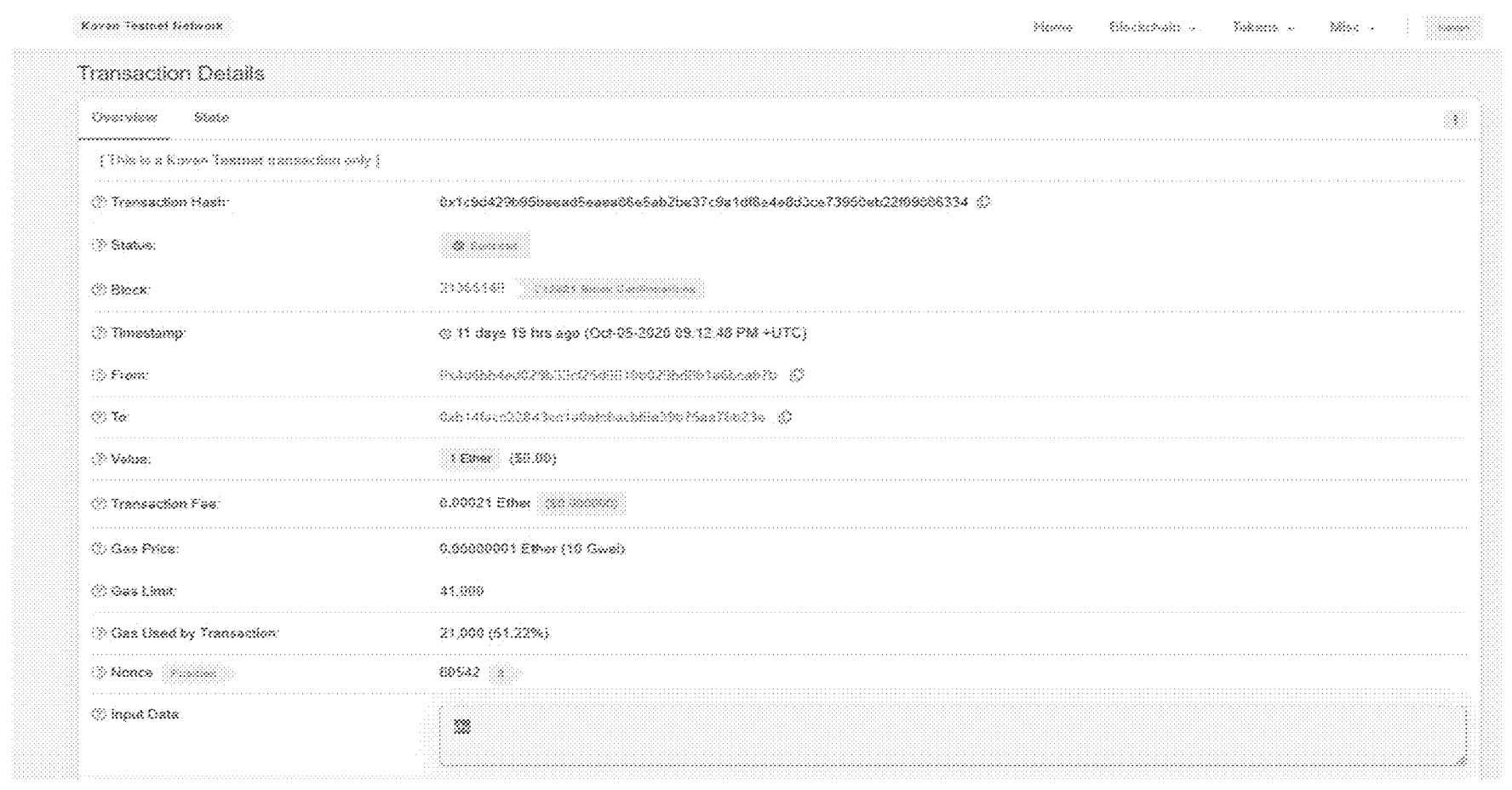

In a second stage, a URL verification by the software can be executed by accessing the URL from the public blockchain. This is where the decentralized blockchain system plays an important role. Public blockchains can validate or verify data or content given in a URL as follows. The public key is used to record the data, and a simple lookup on the blockchain (see, e.g., FIG. 3), where the data is stored as a smart contract, will provide the user the ability to store and retrieve or lookup this usage.

Figure 4:
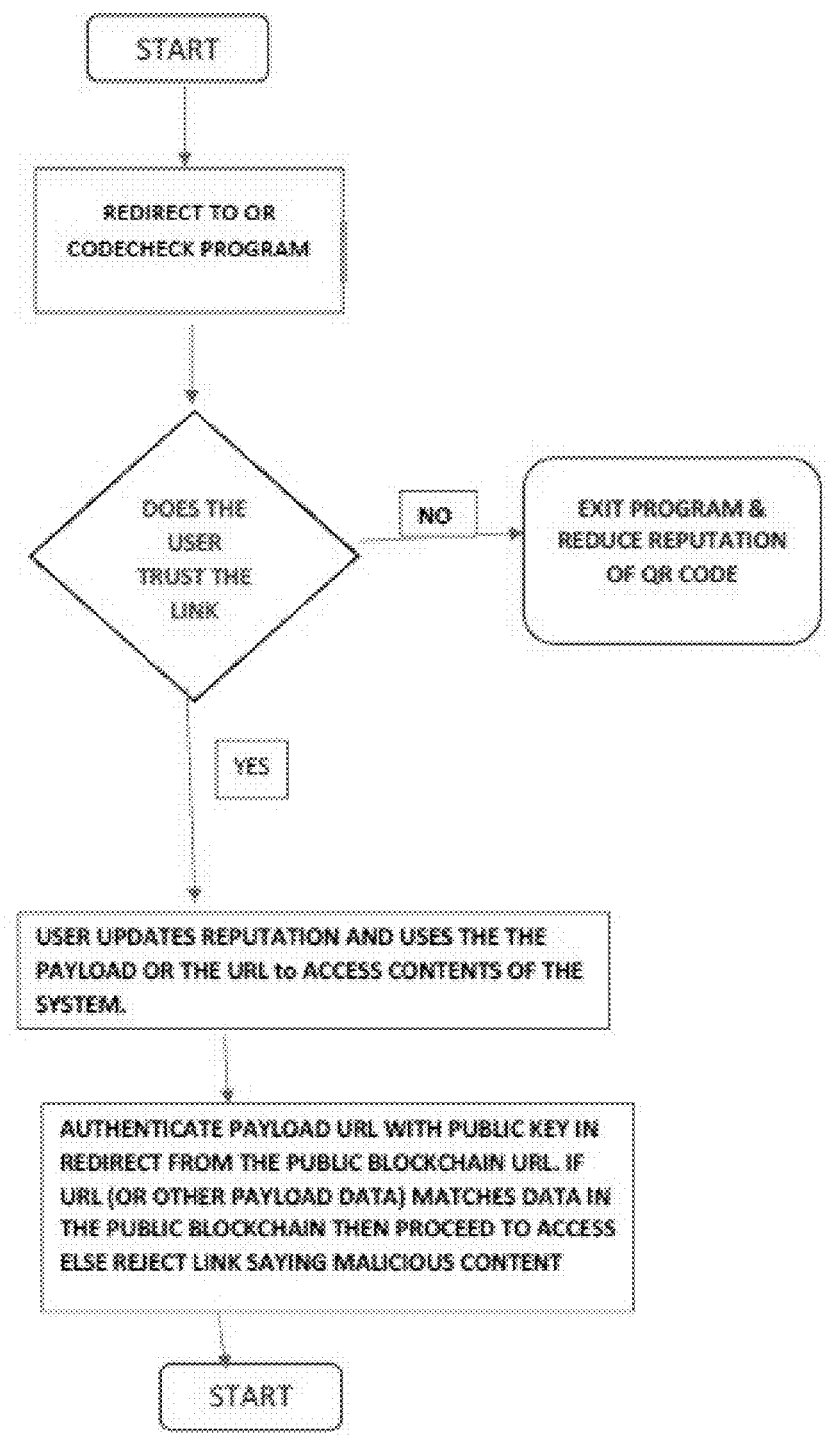
FIG. 4 shows a flowchart for enhancing security of QR code scanning, according to an embodiment of the subject invention.
Figure 5:
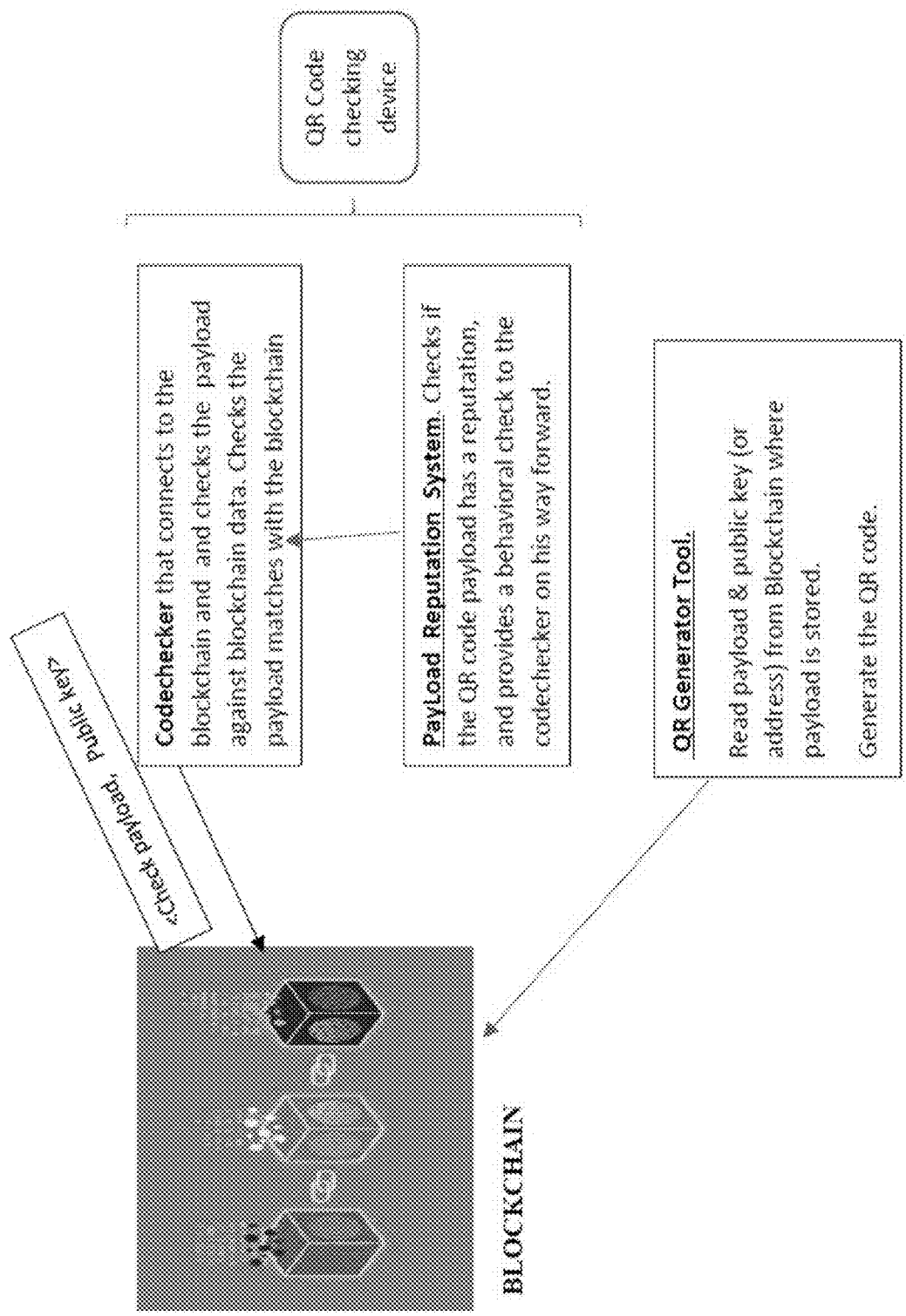
FIG. 5 shows an architecture of a security device, according to an embodiment of the subject invention.

The URL or other payload that is on the QR code can be checked using a simple hash code or a sha-256 algorithm as follows (e.g., Compare sha256 (inputURL, dataURLfromEthBlockchain). If these URLS are the same, then a user can proceed to the website. This additional layer of blockchain security makes QR codes virtually un-hackable through a two-factor authentication mechanism. The first factor is a reputation mechanism where the user chooses whether to view the URL in the user prompt provided by the software. This step places behavioral checks in which the user can on any suspicion decide to not continue to the next stage (i.e., the URL or other payload of the QR code). In the second factor/stage of the authentication, the URL (or other payload) of the QR code is checked against a local version of the blockchain node for authentication. FIG. 4 shows a flowchart of the two-factor authentication according to embodiments of the subject invention. FIG. 5 shows an architecture of a security device according to embodiments of the subject invention, including its interfaces with the blockchain.

The systems and methods of embodiments can be implemented via instructions (e.g., stored on a machine-readable medium (e.g., a (non-transitory) computer-readable medium)) that can be executed by a processor (the processor, the medium, and or the instructions can be part of the system), which can be on the user device or separate from the user device.

Embodiments of the subject invention provide solutions to the technical problem of how to address common QR code hacking cases, especially when malicious URLs are used, or different types of security vulnerabilities are unknowingly embedded into QR codes. Users, over a period of time, will get used to the MyCodeChecker layer and will only trust those QR codes that come with an additional design label or color code that can actually be verified through the public key encryption as a transaction on a live blockchain.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for providing security for quick response (QR) codes, the system comprising:
   a processor; and
   a machine-readable medium in operable communication with the processor, the machine-readable medium having instructions stored thereon that, when executed by the processor, perform the following steps:

receiving data of a QR code scanned by a device of a user of the system, the data comprising a uniform resource locator (URL) and a key;

providing a prompt to the device of the user requesting the user to input whether the user trusts the URL of the QR code;

upon the user inputting that the user does not trust the URL of the QR code, denying the device access to the URL of the QR code;

upon the user inputting that the user trusts the URL of the QR code, checking the key of the QR code against verification data of a blockchain;

upon the key of the QR code not matching the verification data of the blockchain, denying the device access to the URL of the QR code;

upon the key of the QR code matching the verification data of the blockchain, allowing the device access to the URL of the QR code; and adjusting a quantitative reputation value of the URL of the QR code, the adjusting of the quantitative reputation value comprising increasing or decreasing the quantitative reputation value after the user inputs that the user trusts or does not trust, respectively, the URL of the QR code, the quantitative reputation value of the URL of the QR code being based solely on input from users of the system, and the prompt provided to the device of the user requesting the user to input whether the user trusts the URL of the QR code further comprising providing to the device of the user the quantitative reputation value of the URL of the QR code.

2. The system according to claim 1, the key of the QR code being a public key.

3. The system according to claim 1, the blockchain being the Bitcoin Blockchain, the Ethereum Blockchain, or the Algorand Blockchain.

4. The system according to claim 1, the device of the user being a mobile device comprising a display to which the prompt requesting the user to input whether the user trusts the URL of the QR code is provided.

5. The system according to claim 1, the device of the user being a smart device comprising a display to which the prompt requesting the user to input whether the user trusts the URL of the QR code is provided.

6. The system according to claim 1, the verification data of the blockchain being a smart contract.

7. The system according to claim 6, the smart contract being generated by an owner of the URL of the QR code.

8. A method for providing security for quick response (QR) codes, the method comprising:

receiving data of a QR code scanned by a device of a user, the data comprising a uniform resource locator (URL) and a key;

providing a prompt to the device of the user requesting the user to input whether the user trusts the URL of the QR code;

upon the user inputting that the user does not trust the URL of the QR code, denying the device access to the URL of the QR code;

upon the user inputting that the user trusts the URL of the QR code, checking the key of the QR code against verification data of a blockchain;

upon the key of the QR code not matching the verification data of the blockchain, denying the device access to the URL of the QR code;

upon the key of the QR code matching the verification data of the blockchain, allowing the device access to the URL of the QR code; and adjusting a quantitative reputation value of the URL of the QR code, the adjusting of the quantitative reputation value comprising increasing or decreasing the quantitative reputation value after the user inputs that the user trusts or does not trust, respectively, the URL of the QR code, the quantitative reputation value of the URL of the QR code being based solely on input from users of the system, and the prompt provided to the device of the user requesting the user to input whether the user trusts the URL of the QR code further comprising providing to the device of the user the quantitative reputation value of the URL of the QR code.

9. The method according to claim 8, the key of the QR code being a public key.

10. The method according to claim 8, the blockchain being the Bitcoin Blockchain, the Ethereum Blockchain, or the Algorand Blockchain.

11. The method according to claim 8, the device of the user being a mobile device comprising a display to which the prompt requesting the user to input whether the user trusts the URL of the QR code is provided.

12. The method according to claim 8, the device of the user being a smart device comprising a display to which the prompt requesting the user to input whether the user trusts the URL of the QR code is provided.

13. The method according to claim 8, the verification data of the blockchain being a smart contract.

14. The method according to claim 13, the smart contract being generated by an owner of the URL of the QR code.

15. A system for providing security for quick response (QR) codes, the system comprising:

a processor; and a machine-readable medium in operable communication with the processor, the machine-readable medium having instructions stored thereon that, when executed by the processor, perform the following steps:

receiving data of a QR code scanned by a device of a user of the system, the data comprising a uniform resource locator (URL) and a key;

providing a prompt to the device of the user requesting the user to input whether the user trusts the URL of the QR code;

upon the user inputting that the user does not trust the URL of the QR code, denying the device access to the URL of the QR code;

upon the user inputting that the user trusts the URL of the QR code, checking the key of the QR code against verification data of a blockchain;

upon the key of the QR code not matching the verification data of the blockchain, denying the device access to the URL of the QR code;

upon the key of the QR code matching the verification data of the blockchain, allowing the device access to the URL of the QR code; and adjusting a quantitative reputation value of the URL of the QR code, the adjusting of the quantitative reputation value comprising increasing or decreasing the quantitative reputation value after the user inputs that the user trusts or does not trust, respectively, the URL of the QR code, the key of the QR code being a public key, the blockchain being the Bitcoin Blockchain, the Ethereum Blockchain, or the Algorand Blockchain, the device of the user being a mobile, smart device comprising a display to which the prompt requesting the user to input whether the user trusts the URL of the QR code is provided, the verification data of the blockchain being a smart contract generated by an owner of the URL of the QR code, the quantitative reputation value of the URL of the QR code being based solely on input from users of the system, and the prompt provided to the device of the user requesting the user to input whether the user trusts the URL of the QR code further comprising providing to the device of the user the quantitative reputation value of the URL of the QR code.

\* \* \* \* \*